Nov. 3, 1959 G. S. KNOX 2,911,186
GATE VALVE
Filed July 13, 1956 3 Sheets-Sheet 1
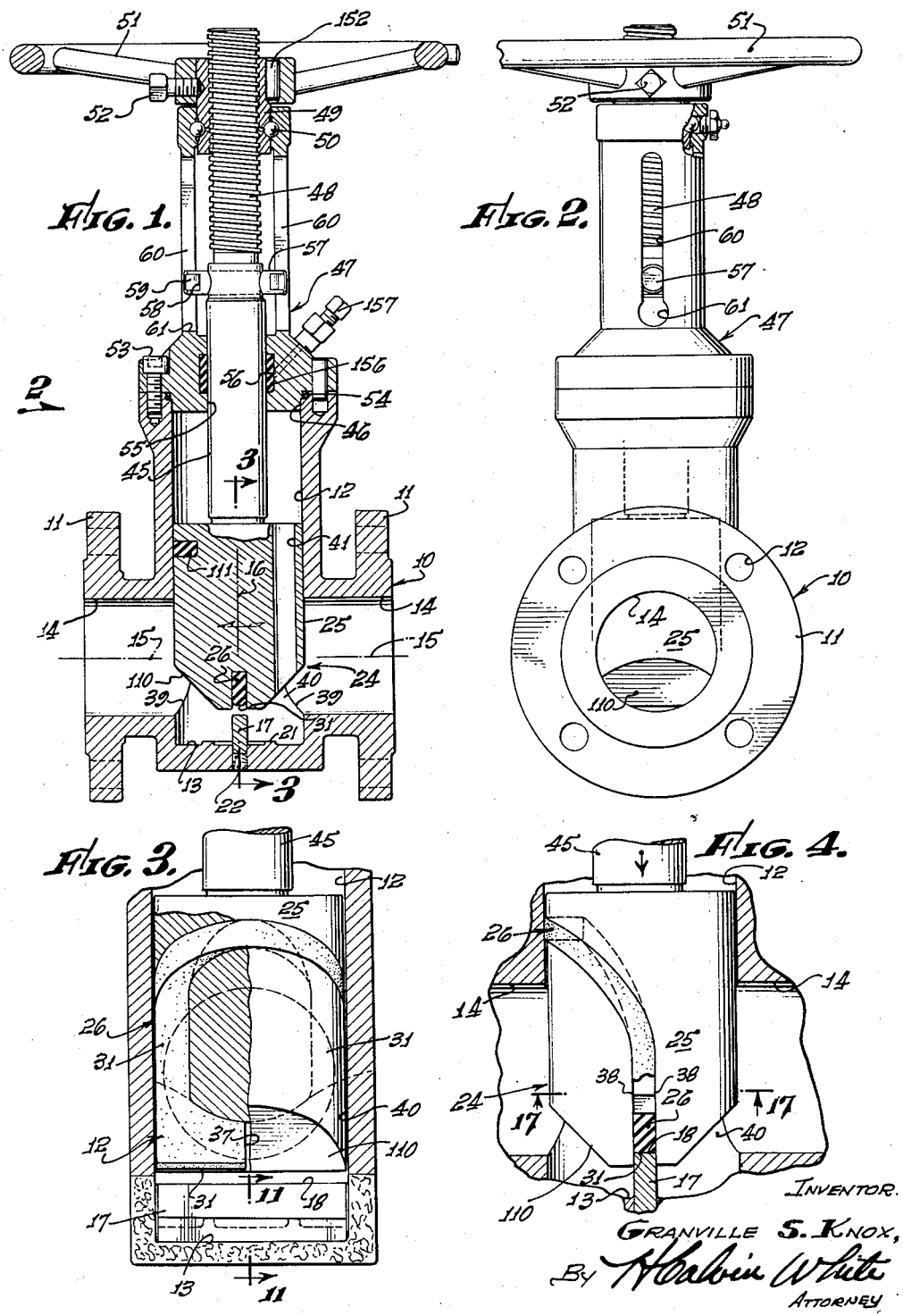
INVENTOR.
GRANVILLE S. KNOX,
By Halvin White
ATTORNEY Nov. 3, 1959 G. S. KNOX 2,911,186
GATE VALVE
Filed July 13, 1956 3 Sheets-Sheet 2
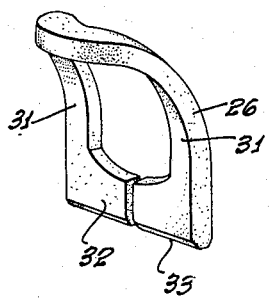
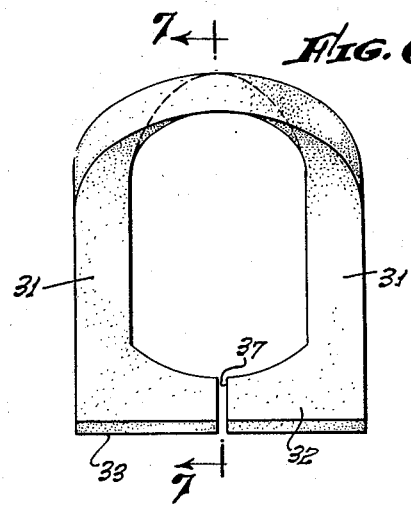
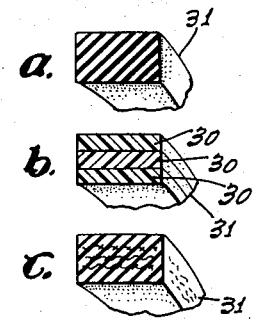
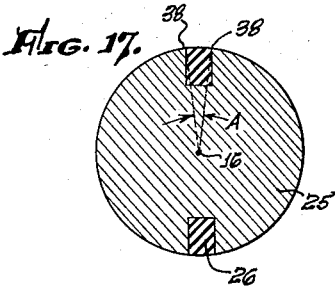
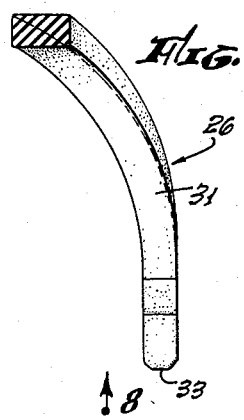
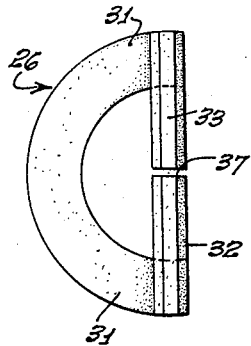
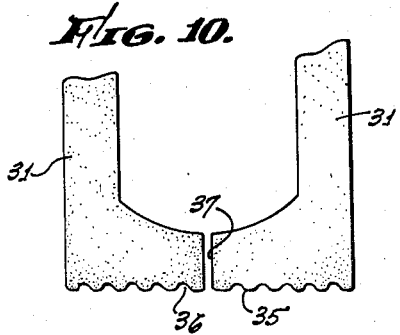
GRANVILLE S. KNOX,
INVENTOR
BY *[signature]*
ATTORNEY Nov. 3, 1959 G. S. KNOX 2,911,186
GATE VALVE
Filed July 13, 1956 3 Sheets-Sheet 3

INVENTOR.
GRANVILLE S. KNOX,
By
ATTORNEY.

United States Patent Office 2,911,186
Patented Nov. 3, 1959

2,911,186

GATE VALVE

Granville S. Knox, Glendale, Calif., assignor to Hydril Company, Los Angeles, Calif., a corporation of Ohio Application July 13, 1956, Serial No. 597,776

5 Claims. (Cl. 251—191)

This invention relates generally to valves, and more particularly has to do with an improved gate valve capable of operating and effectively sealing under widely variable pressure and temperature conditions and characterized by its essential simplicity of construction and ease of operation lending a high degree of utility to the valve.

Basically the valve improvements are directed to overcoming certain difficulties encountered in effecting and maintaining the sealing function of a valve where internally tenacious plastic packing materials such as rubber are used for sealing off against certain fluids. In practice it was found that rubber packing tends to swell or increase in volume when coming in contact with aromatic hydrocarbons, and it is therefore necessary to provide means compensating for physical expansion of a rubber seal if the valve is to be made satisfactorily operable without sticking or jamming. Also, plastic packing material and especially rubber tends to remain in sealed condition under the influence of fluid pressure as the valve is opened, resulting in stressing of the material beyond its ultimate strength as it deforms into gaps between separating metal parts to such an extent that the packing is subsequently nibbled or worn away by the metal as the valve is repeatedly opened and closed. Particles of packing thus removed tend to flow through the connecting lines causing objectionable contamination of the fluid in the system. In certain types of rubber sealed valves the rubber may swell to such an extent that the relatively movable metal parts cannot be brought together in a manner such as to completely confine the packing material, and when this happens the packing may be forced out of its proper position by differential fluid pressure in the valve causing malfunctioning or failure of the valve to operate.

In overcoming these difficulties, the invention contemplates the provision of a movable valve stopper containing a substantially continuous channel in which a substantially loop shaped packing is carried for pressurization by a projection or seat extending into the valve chamber and toward which the stopper is movable to close the valve, the extent and location of the packing being such that when the valve is opened and closed the packing never traverses a port, yet when pressurized it seals against the seat and chamber walls to prevent all fluid flow through the valve.

The chamber walls and stopper portion forming the channel facing the walls are made closely interfitting to confine the packing in the channel throughout valve assembly traverse, and also the projection and stopper channel portion receiving the projection are made closely interfitting to provide metal overlap when the packing is pressurized and the stopper moved to flow blanking position, so that in the event an accidentally caused fire destroys the packing the stopper will remain effectively closed on the projection.

While the portion of the packing facing the chamber walls may have different widths, it is desirable that the remainder of the packing facing the projection or seat be relatively narrow throughout its transverse extent, with the seat also being correspondingly narrow for engagement therewith. This construction provides for an effective reduction in the amount of force or torque required to be applied to the valve handwheel in pressurizing the packing, since the required force is proportional to the packing area engageable by the seat. Also, pressurization of the whole transverse extent of the packing by the seat facilitates pressure distribution to the remainder of the packing facing the chamber walls.

For achieving minimum packing wear, especially in high pressure applications, the packing at the stopper end facing the seat for contact thereby is desirably tapered as by a chamfer at opposite sides of the packing or scalloped terminating within the channel inwardly of its mouth, so that when the valve is opened the tendency of the packing to remain sealed is minimized, as will be described.

Further objects of the invention include a channel design accommodating the effective compaction, anchoring and ready replacement of such different packing materials as rubber which can be continuous or loop shaped to be stretched over and snapped into the stopper channel, and sintered tetrafluoroethylene plastic, molded asbestos and lead which though relatively hard can be slotted for easy assembly on the stopper. In either case the packing is effectively anchored in the channel since it is looped about the stopper. Other features concern the connection of the valve stopper assembly and actuating member therefore with the valve bonnet accommodating their rapid disconnection, yet preventing inadvertent disassembly in the field, the establishment of a relationship between stopper and port size providing for maximum flow through the open valve without interfering with effective sealing of the pressurized packing against the valve chamber walls and the provision of an air gap between two spaced packings on a stopper to positively prevent any possibility of fluid leakage from one side of the valve to the other, as will be brought out.

These and other features and objects of the invention as well as the details of an illustrative embodiment, will be more fully understood from the following detailed description of the drawings, in which:

Fig. 1 is a vertical section taken through the valve assembly showing its interior structure;

Fig. 2 is a vertical end elevation of the valve assembly;

Fig. 3 is an enlarged section taken on line 3—3 of Fig. 1 showing the stopper assembly disengaged from the raised seat in the bore;

Fig. 4 is an enlarged elevation partially in section showing the stopper assembly engaging the seat in the bore, the view of the stopper assembly being similar to that of Fig. 1;

Fig. 5 is a perspective view of the packing disassembled from the stopper;

Fig. 6 is a front view of the packing;

Fig. 7 is a section taken on line 7—7 of Fig. 6;

Fig. 8 is an end view of the packing looking in the direction of arrow 8 in Fig. 7;

Figs. 9a through 9c are sections taken through different usable forms of packing materials showing details of their construction;

Fig. 10 is a front elevation of the portion of a modified form of the packing;

Fig. 17 is a section taken on line 17—17 of Fig. 4.

Figure 11:
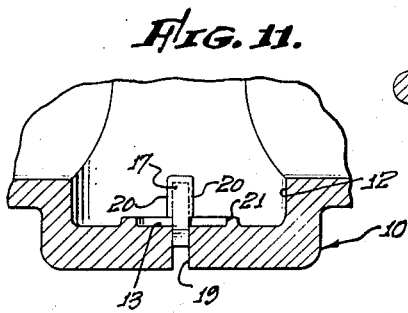
Fig. 11 is a section taken on line 11—11 of Fig. 3 showing the manner in which the insert seat is connected with the valve body.

Referring first to Figs. 1 and 2, the metallic valve body generally indicated at 10 has opposite end flanges 11 with drilled openings 12 for connecting the flanges to complementary pipe flanges, the body containing a cylindrical upright bore opening upwardly and closed at its lower end 13. The body also forms a pair of coaxial fluid inlet and outlet passages 14 shown with their axes 15 intersecting the bore axis 16 at right angles.

An elongated rather narrow bar 17 projects upwardly into the lower end of the bore 12 and extends across the bore substantially transversely relative to the general direction of fluid flow between the passages 14, as seen in Fig. 1. The bar forms a narrow elongated seat 18 projecting upwardly into the bore and over which fluid flows when the valve is open so that any sediment carried by the fluid will be washed over the seat without collecting thereon, the fluid tending to be carried through the valve or otherwise to collect below the level of the seat at the closed lower end 13 of the bore.

Figure 12A:
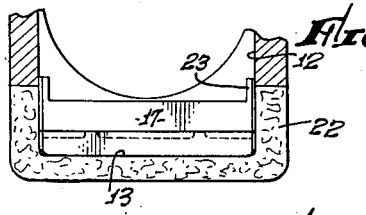
Figs. 12a and 12b are frontal views of the insert seat showing different stages in its connection into the valve body.
Figure 12B:
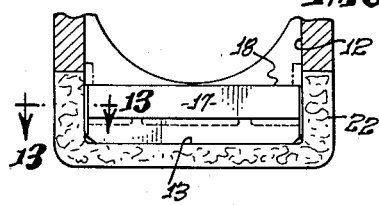
Figure 13:
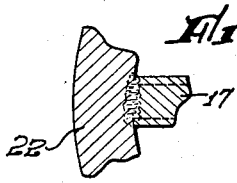
Fig. 13 is a section taken on line 13—13 of Fig. 12b.
Figure 16:
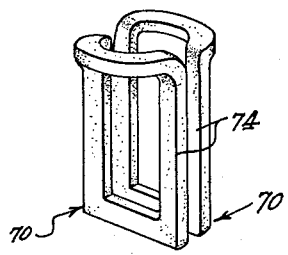
Fig. 16 is a perspective view of the packing shown assembled on the stopper in Fig. 14.

The manner of connecting bar 17 with the body will now be described with reference to Figs. 11 through 13, wherein the bar is shown inserted within a slot 19 milled in the lower end 13 of body 10 after the body bore has been accurately sized to closely fit the stopper by boring or grinding the bore surface all the way to the closed end of the body. The bar is then introduced downwardly through the bore into the slot with the enlarged width portions 20 of the bar seating on annular boss 21 projecting upward into the bore, as seen in Fig. 11. Welding material 22 is then introduced into slot 19 from the exterior of the body to weld the bottom and opposite ends of the bar with the body, and finally the bar ears 23 projecting upwardly at opposite ends of the bar to cover the upper extremities of the slot are bored out along with any weld material introduced into the bore so that the bar is rigidly connected in continuous sealing engagement with the body, as seen in Figs. 12a, 12b and 13 and may be considered as being integral with the body 10.

Referring back to Figs. 1 through 4, a stopper assembly generally indicated at 24 is shown mounted in the bore for sliding movement toward and away from the seat 18, the assembly including a cylindrical stopper 25 and internally tenacious packing material 26 carried by the stopper. There is sufficient clearance between the stopper and the bore wall to accommodate relatively free stopper movement toward and away from the seat for closing and opening the valve, and opposite lower sides of the stopper are tapered or chamfered at 110 toward the seat so that the stopper can be more readily forced through any accumulations of sediment in the bottom of the valve, and so that fluid may readily flow below the stopper from an inlet passage, and over the seat when the valve is opened.

A relatively narrow continuous or circulate channel 111 is formed in the stopper to open outwardly toward bore wall portions covering the channel in all stopper positions and toward the seat 18, with the packing 26 fitting within and extending through the channel as shown. The channel is best described as being substantially continuous or circulate in the sense that it extends generally in an endless circuit and also in a plane curving upwardly away from the stoppers lower end and laterally toward a bore wall portion approximately above one of the passages 14, with the lowermost portion of the channel opening downwardly toward the seat and being sized to receive the seat when the valve is closed.

This configuration of the channel accommodates ready fitting of the packing material into the channel when the packing is of the shape shown in Figs. 5 through 10, Figs. 9a through 9c respectively illustrating the use of lead packing, several laminations or layers 30 of sintered tetrafluoroethylene plastic and reinforced internally tenacious synthetic rubber packing. The smoothly curved contour of the packing arms 31 projecting upwardly from the transverse lower portion 32 facilitates ready transmission of pressure to all portions of the packing when its lower end or face 33 is brought into engagement with the seat 18 by movement of the stopper assembly, so that such different materials as lead, molded asbestos, sintered tetrafluoroethylene plastic and rubber may be pressurized against the channel walls, bore walls and seat to produce a highly desirable and effective type of pack-off against fluid pressures ranging up to at least five thousand p.s.i. Furthermore, since such packing materials as lead and tetrafluorethylene plastic may be utilized, the valve may be made suitable for application in systems wherein highly corrosive fluids must be controlled.

Especially where rubber packing is mounted on the stopper, the portion thereof extending within the transverse channel in the stopper end is desirably chamfered or tapered toward the channel mouth so that as the stopper assembly is disengaged from the seat 18, as from the compressed condition shown in Fig. 4 to the released or unpressurized condition of Fig. 3, the rubber will tend naturally to break away without remaining in sealed condition on the seat. Also, the transverse packing is spaced inwardly from the channel mouth, which is itself sized to receive the seat 18 and bar 17 with a relatively close fit as the stopper assembly is advanced toward closed or flow blanking position. The resultant metal overlap of the stopper end and bar 17 ensures closure of the valve against fluid pressure even though the packing may be destroyed by excessive temperature conditions as during a fire. Also, the overlap prevents substantial extruding of the packing into the gap produced when the stopper clears the seat, inasmuch as the packing breaks away from the seat prior to the formation of the gap.

A modified form of rubber packing with serrations 35 on its lower edge 31 in shown in Fig. 10, inner portions 36 of the serrations tending to resiliently break away from the seat 18 when the stopper assembly is retracted in the same manner as does the chamfered packing of Figs. 1 through 8. Both forms of the packing may be slotted at 37 in their transverse portions 32 to permit separate manipulation of the legs 31 during removal or replacement of the packing as respects the stopper channel, the slot 37 being sufficiently narrow to close under pressure when the packing is urged against the seat 18.

Referring back to Figs 1 through 4, it will be observed that the packing 26 at no time traverses the passages 14 but remains facing covering or overlying portions of the bore wall throughout stopper assembly traverse, so that at most the packing can only extrude into the slight clearance between the stopper and bore wall, thereby minimizing packing wear. To realize this favorable condition without unduly reducing the cross sectional area of passages 14 with correspondingly lessened flow capacity of the valve, the passage diameters should not exceed the value of the expression $d \cos \tfrac{1}{2} A$, where $d$ is approximately equal to the bore diameter and A equals the angle subtended by two stopper radii extending to two vertically extending opposite edges of the stopper side channel, as for example two radii extending from axis 16 to points 38 in Fig. 17. The passage diameters may be increased to this value $d \cos \tfrac{1}{2} A$ for maximum valve flow capacity in the open condition, without interfering with the sealing function of the packing since the intersections of the passages 14 with the bore 12 on lines 39 will not then reach as far into the bore as the bore wall "land" 40 against which the vertically extending packing portions must seal when the valve is closed.

The present valve is able to seal effectively against flow in either direction through the passages 14 and bore, the stopper 25 being provided with a drilled passage 41 extending vertically therethrough to communicate fluid pressure to the bore 12 above the stopper, when fluid flows into the valve from right to left in Fig. 1. With fluid pressure exerted both above and below the valve in its open condition, advancement of the stopper toward the seat is facilitated by partial pressure equalization. On the other hand, when fluid flow is from left to right in Fig. 1, lifting of the stopper off the seat is aided by fluid pressure exerted upwardly against the bottom half of the stopper communicating with the left side passage 14.

Referring now to the construction of those parts of the valve operable to displace the stopper assembly axially in the bore, a rod or stem 45 preferably though not necessarily integral with the stopper extends upwardly through the bore opening 46 and through valve bonnet 47, the upper end of the rod being externally threaded at 48 for axial displacement by internally threaded nut 49 connected to the rod threads. The nut is confined to rotate without moving axially by ball bearing 50 engaging suitable external and internal races on the nut and the upper portion of the bonnet respectively, handwheel 51 being connected with the nut by set screw 52 and key 152 for operating the valve. The lower portion of the bonnet extends generally across the bore 12 and is connected with the flanged upper portion of the valve body forming bore opening 46 by screws 53, a ring gasket 54 sealing off between the bonnet and valve body. In addition, the bonnet bore passing the rod 45 contains an annular chamber 56 into which injectable type plastic packing 156 is received through an injector 157 provided with a check valve preventing plastic egress, the packing sealing off between the rod 45 and the bonnet bore 55.

Rod 45 is prevented from rotating by a guide pin 57 extending transversely through and loosely in a drilled passage in the rod, opposite end portions of the pin being provided with shoulders 58 extending transversely of the pin axis for engagement with the bonnet cylinder inside, and flats 59 extending in substantially vertical radial planes relative to the bonnet and within vertical slots or grooves 60 opposite sides of which confine the flats preventing rotation of the pin about the bore axis. Endwise removal of the pin 57 from the rod 45 is resisted by engagement of the pin shoulders 58 with the inside of the bonnet during normal travel of the pin, rod and stopper assembly between open and closed positions; however, upon removing the bonnet from the valve body, the pin 57 may be advanced beyond the position it normally occupies in the slot 60 when the valve is closed, into alignment with the slot enlargement 61 seen in Fig. 2, wherein the pin may be disassembled from the rod by endwise removal through the enlargement since the shoulders 58 are no longer confined by the bonnet inside.

The valve stopper assembly is movable by the handwheel and rod from a fully retracted position permitting unrestricted flow through the valve to a partially advanced position projecting partly across the flow passage to control the rate of flow therethrough, to a further advanced position in which the metal parts of the chamber walls, the projection or seat and the stopper coact to blank the flow even though they may not necessarily produce a seep-proof seal and even though the packing may be destroyed by uncontrolled fire. Finally, the assembly is movable to furthest advanced position to pressurize the packing thereby effecting a positive seal against fluid seepage through the valve flow passage.

Figure 14:
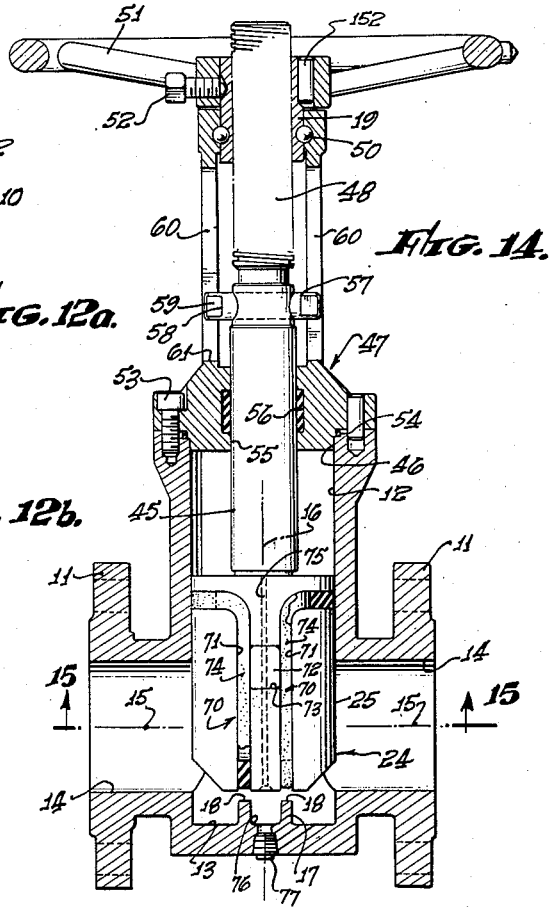
Fig. 14 is a vertical elevation taken through a valve assembly of somewhat modified construction.
Figure 15:
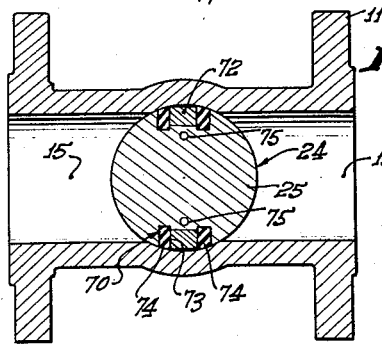
Fig. 15 is a section taken on line 15—15 of Fig. 14.

In the modified form of the valve assembly illustrated in Figs. 14 and 15, to which are applied the same numerals used in Figs. 1 and 2 upon corresponding value components, the valve stopper assembly 24 is shown to include a stopper 25 carrying a spaced symmetrical pair of packings 70, extending through a symmetrical pair of channels 71 in the stopper sides and lower end, the channels extending transversely across the bottom portion of the stopper and in spaced upright parallel planes generally perpendicular to the direction of flow through the valve passages 14 and upwardly toward a transverse plane normal to the axis of the bore and above the level of the passages 14, the upright channel planes curving oppositely into said transverse plane. Thus, the packing extending through the channels remains confined in the channels by covering portions of the bore walls at the sides of the stopper throughout stopper assembly traverse toward and away from the two seats 18.

The seats 18 are sized to be received within the channel mouths at the bottom of the stopper to energize the packings in the same manner as previously described in connection with Fig. 1, the double packing arrangement serving to seal off bore passages 14 when the stopper assembly is in flow blanking position, giving the valve increased sealing capacity and permitting the establishment of an air gap between the packings, in trap 76 between seating bars 17 and in the upper portion of the bore 12. For equalizing the mechanical pressure on the packings a pair of movable plugs 72 are fitted within recesses 73 formed in opposite sides of the stopper and communicating between the upright stretches 74 of the packings, the plugs tending to shift in the recesses to equalize the pressure exerted in the packings. Once the stopper assembly is closed against the seats 18 the drain 77 from the trap 76 may be opened to indicate by the escape of fluid therethrough whether one or the other of the two packings, is leaking fluid from one or the other of the passages 14, thereby providing against the possibility that different fluids in passages 14 might contaminate one another if the packings begin to leak.

I claim:

1. An improved plastic sealed gate valve comprising a longitudinally extending valve chamber having a closed end and laterally opposed fluid flow passages opening into the chamber, said passage openings being spaced longitudinally from said closed end, a rigid bar projecting inwardly into said chamber from the closed end thereof and extending laterally completely across the closed end of the chamber and bisecting a longitudinal end portion of the chamber transversely of said flow passages, the opposite ends and base extents of the bar being continuously and sealingly joined with the chamber inner wall and closed end, a stopper assembly including a valve stopper movable longitudinally in the chamber to and away from a position in which the stopper overlaps the bar, the opposite sides of said bar and the chamber inner wall portions bounding both ends of the bar and at least one of said flow passage openings being sized for close sliding engagement with the valve stopper, said stopper having flow blanking surfaces closely fitting the bar and the said chamber inner wall portions and blanking flow between the passages when the stopper is moved to said position overlapping the bar, said stopper containing a continuous channel sunk inwardly from the stopper surface and bounded by said flow blanking surfaces of the stopper with a portion of the channel facing the chamber inner wall and the remainder of the channel facing the bar, the said channel remainder being sized to receive and closely overlap said bar, an internally tenacious packing material extending substantially through the channel length with the packing in the channel remainder being offset inwardly of the end surface of the stopper, and means for advancing said stopper assembly toward the bar so that the bar enters the channel remainder and pressurizes the packing throughout the channel into sealing engagement with the chamber inner wall and said bar along a continuous path of contact extending between said flow blanking surfaces of the stopper, said bar projecting longitudinally sufficiently into the chamber and toward the stopper that movement of the stopper toward and into a position overlapping the bar is blocked only by pressural engagement of the bar with the packing material in the channel remainder.

2. The invention as defined in claim 1 in which said bar comprises a bar insert joined to the chamber, and said packing is resilient and has chamfered side portions within the channel remainder and facing the bar to lift relatively away from the bar during initial movement of the packing away from pressural engagement with the bar.

3. The invention as defined in claim 1 in which said channel has relatively narrow width and extends in a plane curving away from the channel remainder and toward a chamber wall portion that is at the side of one of said flow passages longitudinally opposite said chamber closed end.

4. An improved plastic sealed gate valve comprising a longitudinally extending valve chamber having a closed end and laterally opposed fluid flow passages opening into the chamber, said passage openings being spaced longitudinally from said closed end, a pair of rigid bars projecting inwardly into said chamber from the closed end thereof and extending laterally in spaced apart parallel relation completely across the closed end of the chamber and projecting into a longitudinal end portion of the chamber transversely of said flow passages, the opposite ends and base extents of the bars being continuously and sealingly joined with the chamber inner wall and closed end, a stopper assembly including a valve stopper movable longitudinally in the chamber to and away from a position in which the stopper overlaps said bars, the opposite sides of said bars and the chamber inner wall portions bounding both ends of the bars and at least one of said flow passage openings being sized for close sliding engagement with the valve stopper, said stopper having flow blanking surfaces closely fitting the bars and chamber inner wall adjacent the bars and blanking flow between the passages when the stopper is moved to said position overlapping the bars, said stopper containing laterally spaced apart channels sunk inwardly from the stopper surface, each channel being bounded by said flow blanking surfaces of the stopper with a portion of the channel facing the chamber inner wall and the remainder of the channel facing the bar, the said channel remainders being sized to receive and closely overlap said bars, internally tenacious packing material extending substantially through the channel lengths with the packing in the channel remainders being offset inwardly of the end surface of the stopper, and means for advancing said stopper assembly toward said bars so that the bars enter the channel remainders and pressurize the packing throughout the channels into sealing engagement with the chamber inner wall and said bars along two continuous and laterally spaced paths of contact, said bars projecting longitudinally sufficiently into the chamber and toward the stopper that movement of the stopper toward and into position overlapping the bars is blocked only by pressural engagement of the bars with the packing in the channel remainders.

5. An improved plastic sealed gate valve comprising a longitudinally extending valve chamber having a closed end and laterally opposed fluid flow passages opening into the chamber, said passage openings being spaced longitudinally from said closed end, a pair of rigid bars projecting inwardly into said chamber from the closed end thereof and extending laterally in spaced apart parallel relation completely across the closed end of the chamber and projecting into a longitudinal end portion of the chamber transversely of said flow passages, the opposite ends and base extents of the bars being continuously and sealingly joined with the chamber inner wall and closed end, a stopper assembly including a valve stopper movable longitudinally in the chamber to and away from a position in which the stopper overlaps said bars, the opposite sides of said bars and the chamber inner wall portions bounding both ends of the bars and at least one of said flow passage openings being sized for close sliding engagement with the valve stopper, said stopper having flow blanking surfaces closely fitting the bars and chamber inner wall adjacent the bars and blanking flow between the passages when the stopper is moved to said position overlapping the bars, said stopper containing laterally spaced apart channels sunk inwardly from the stopper surface, each channel being bounded by said flow blanking surfaces of the stopper with a portion of the channel facing the chamber inner wall and the remainder of the channel facing the bar, the said channel remainders being sized to receive and closely overlap said bars, internally tenacious packing material extending substantially through the channel lengths with the packing in the channel remainders being offset inwardly of the end surface of the stopper, and means for advancing said stopper assembly toward said bars so that the bars enter the channel remainders and pressurize the packing throughout the channels into sealing engagement with the chamber inner wall and said bars along two continuous and laterally spaced paths of contact, said bars projecting longitudinally sufficiently into the chamber and toward the stopper that movement of the stopper toward and into position overlapping the bars is blocked only by pressural engagement of the bars with the packing in the channel remainders, said stopper containing a recess in the space between said laterally spaced apart channels, and including a movable member in said recess engageable with said packings for equalizing differential pressure exerted thereon.

References Cited in the file of this patent

UNITED STATES PATENTS

| | | |
|---|---|---|
| 1,633,690 | Wilson | June 28, 1927 |
| 1,793,094 | King | Feb. 17, 1931 |
| 2,049,516 | Ruhstorfer | Aug. 4, 1936 |
| 2,163,178 | Otis | June 20, 1939 |
| 2,194,254 | King | Mar. 19, 1940 |
| 2,229,871 | Penick | Jan. 28, 1941 |
| 2,238,357 | Allen | Apr. 15, 1941 |
| 2,331,557 | Lorehn | Oct. 12, 1943 |
| 2,593,793 | Rector | Apr. 22, 1952 |

FOREIGN PATENTS

| | | |
|---|---|---|
| 477,656 | Canada | Oct. 9, 1951 |